UNITED STATES PATENT OFFICE.

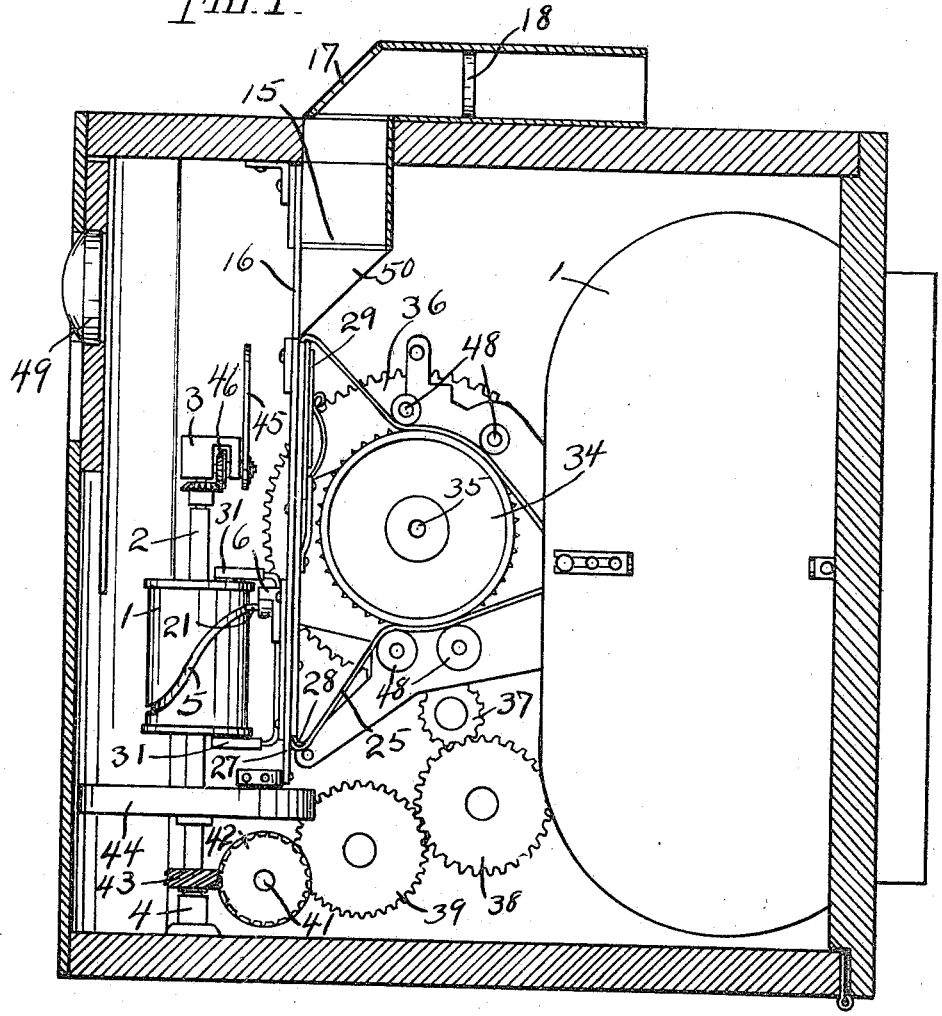

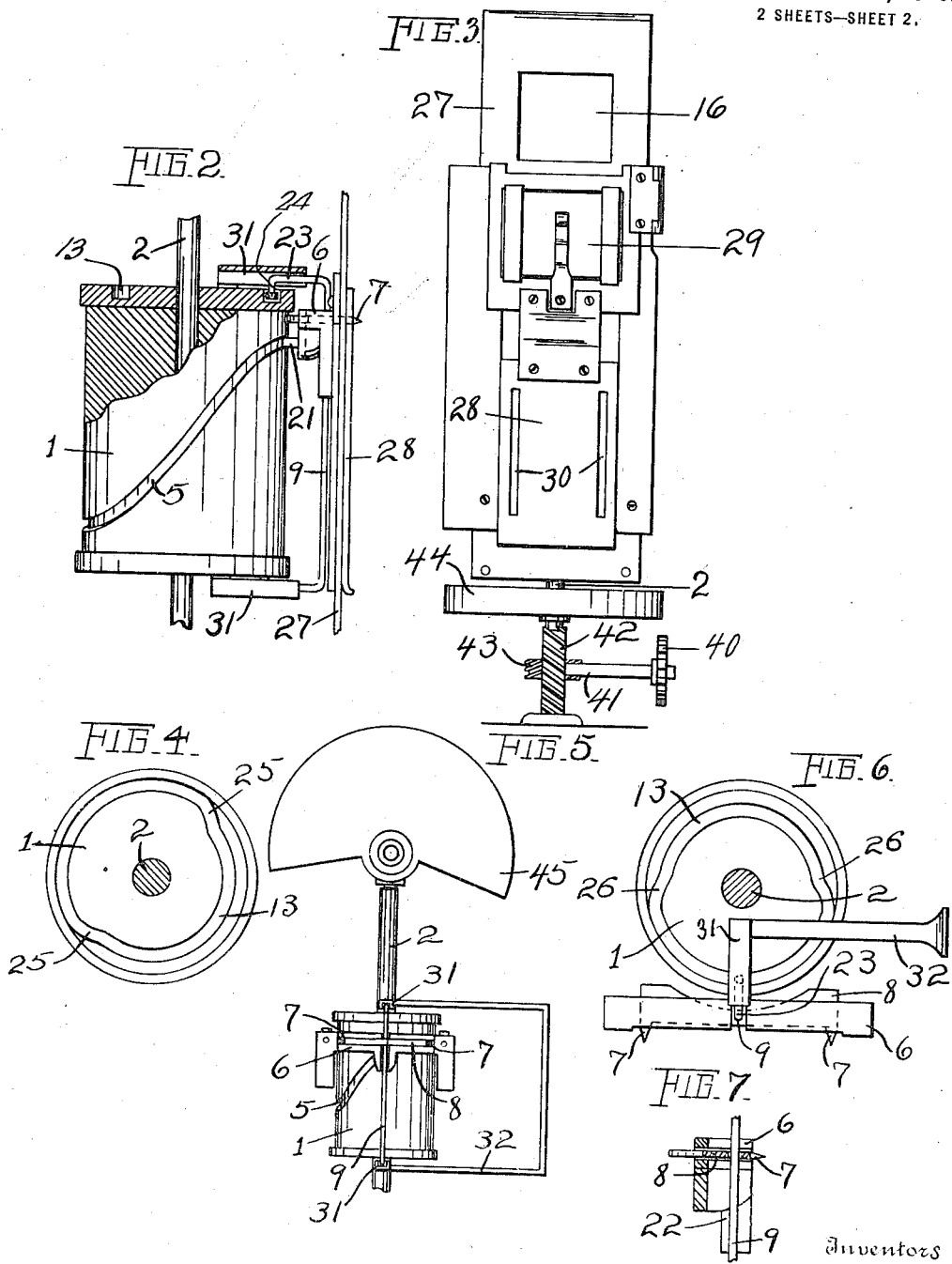

FRED A. GILDERSLEEVE AND WILLIAM L. TRICE, OF WACO, TEXAS.

FILM-ACTUATING MECHANISM FOR MOTION-PICTURE CAMERAS.

1,260,891.  Specification of Letters Patent.  Patented Mar. 26, 1918.

Application filed May 12, 1917. Serial No. 168,096.

*To all whom it may concern:*

Be it known that we, FRED A. GILDERSLEEVE and WILLIAM L. TRICE, both citizens of the United States of America, residing at Waco, in the county of McLennan and State of Texas, have invented certain new and useful Improvements in Film-Actuating Mechanism for Motion-Picture Cameras, of which the following is a specification.

Our invention relates to cinematograph motion picture cameras, and the object is to improve and simplify the construction and operation of motion picture cameras, to provide mechanism which is compact and which can be mounted in a relatively small casing, which has a film capacity of two hundred feet approximately more or less, and which will make steady pictures. Other objects are to provide a machine that will have comparatively no vibrations, to equip such machine with a film pulling mechanism having ball bearings, to provide such machine in which all cams are operated by one shaft, and to provide an improved focusing device which can be used both as a view finder and as means for focusing the lens which can be accomplished without opening the casing and without losing a single exposure. Other objects and advantages will be fully explained in the following description and the invention will be more particularly pointed out in the claims.

Reference is had to the accompanying drawings which form a part of this application.

Figure 1 is a vertical section of the casing, showing a side elevation of the parts of the machine forming the improvements set forth herein. Fig. 2 is a detail view of the drum which actuates the film moving mechanism. Fig. 3 is a detail view of the aperture plate. Fig. 4 is an end view of the actuating drum, showing the cam for shifting the film claws. Fig. 5 is a detail view of the claw carrier and the means for mounting and operating the same. Fig. 6 is a plan view of the claw carrier and the actuating drum. Fig. 7 is a detail section of the claw carrier and one claw.

Similar characters of reference are used to indicate the same parts throughout the several views.

The machine is provided with a suitable casing for containing the operating mechanism. A drum 1 is mounted on a vertical shaft 2 which is provided with ball bearings at 3 and 4. The drum 1 is provided with a cam groove 5 for elevating and lowering of the claw carrier 6. The film engaging claws 7 are formed on a horizontal bar 8 which is mounted in a slot in the carrier 6. The carrier 6 is moved vertically by a pin or lug 21 which is rigid with the carrier 6 and projects into the groove 5 in the drum 1 which groove is an endless cam groove in the periphery of the drum. As the drum is driven continuously in the same direction, the carrier 6 will be reciprocated vertically by the drum. The bar 8 is reciprocated horizontally by the vertically disposed rod or bar 9, which runs through the bar 8 which carries the claws 7. The carrier 6 is provided with depending guide slides 22. The terminals of the rod 9 are bent horizontally at the top and bottom to form arms 23 which project above and below the drum 1. The arms 23 carry roller bearing studs 24 which project into grooves 13 which are partly circular and which have partly cam-shaped, or inclined portions 26 the regular curves in the grooves 13 being of different diameters. When the drum 1 is driven, the studs 24 will run in the larger curves to thrust the claws 7 into the film 25 while the claws are being forced downwardly by the carrier 6 and at the end of the downward movement of the carrier 6, the studs 24 will be forced by the cam portions 26 to the smaller curves in grooves 13 and thus withdraw the claws 7 from the film 25 and the smaller curves will hold the claws 7 back in the carrier 6 while the carrier is moving back to the top part of the drum 1. The studs 24 will then be forced by the cam portions 26 of the grooves 13 to the larger curves for thrusting the claws 7 again into the film. The film will thus be drawn at regular intervals for a distance equal to the vertical travel of the carrier 6. The film 25 will be drawn downwardly between the aperture plate 27 on one side and the film pad 29 and film holding plate 28 on the other side. The plates 27 and 28 have slots 30 through which the claws 7 project for engaging the film. Guides 31 are provided for the arms 23 and these guides are supported by a double arm bracket 32 which is attached to the casing. The arms 23 will move freely in the guides as the arms are shifted horizontally by the studs 24 and grooves 13. The film 25 is wound off and on drums of ordinary type which are inclosed in an ordinary casing 33. The film is moved by a toothed drum 34 of the usual type which is driven by a shaft 35. A cog wheel 36 is rigid with the shaft 35 and drives a pinion 37. The pinion 37 drives a cog wheel 38 which drives another cog wheel 39. The cog wheel 39 drives a pinion 40 which is rigid with shaft 41. The shaft 41 is driven by the pinion 40 and drives a worm gear wheel 42 which is rigid therewith. The gear wheel 42 meshes with and drives the pinion 43 which is rigid with and drives the shaft 2. The shaft 2 is provided with a balance wheel 44 for causing steady driving of the drum 1, and the shutter 45 through gearing 46 and 47. The film is moved by the gearing thus described and by the film claws. Idlers 48 coöperate with the drum 34 in moving the film by pressing the film against the drum.

The lens 49 is made movable vertically so that the lens can be placed adjacent to the finder aperture in plate 27 and also lowered to a position adjacent to the film making aperture in this plate.

A prism 14 is mounted back of and adjacent to the film aperture 16 in a casing 15. The casing projects up through the main casing and a mirror 17 and a magnifying glass 18 are mounted in the casing 15. The finding of the object may be accomplished by looking through the mirror 17 or through the magnifying glass 18.

What we claim, is,—

1. A motion picture camera having a film pulling mechanism consisting of a carrier having a horizontally projecting lug, a rotating drum having an endless cam groove for receiving said lug for reciprocating said carrier vertically, a pair of claws mounted in said carrier, and operating connections between said claws and said drum for thrusting said claws into the film and for releasing the claws from the film.

2. A motion picture camera having a film pulling mechanism consisting of a shaft provided with ball bearings, a drum rigid with said shaft and having an endless cam groove in the periphery thereof, means for rotating said shaft, a carrier having a lug projecting into said groove, claws mounted in said carrier, said drum having endless cam grooves in the ends thereof, and means operatively connecting said claws with said grooves for automatically shifting said claws.

3. A motion picture camera having a film pulling mechanism consisting of a vertically disposed shaft provided with ball bearings, a drum rigid with said shaft and provided with an endless cam groove in the periphery of said drum, a carrier having a slot therein and having a lug projecting into said groove for vertically reciprocating said carrier, a bar provided with claws horizontally disposed in said carrier, said drum having endless cam grooves in the ends thereof, and a yoke running through said bar and having studs projecting into said grooves for automatically shifting said claws horizontally in said carrier.

4. A motion picture camera having a film pulling mechanism consisting of a vertically disposed shaft provided with ball bearings and a balance wheel, a drum rigid with said shaft and provided with an endless spiral cam groove in the periphery thereof, a carrier having a horizontal slot therein and having a lug projecting in said groove for vertically reciprocating said carrier, means for rotating said shaft, a bar horizontally disposed in said carrier and provided with claws, said drum having endless curved grooves in the ends thereof, and a vertically disposed yoke running through said bar and having roller bearing studs projecting into said grooves whereby said claws are automatically thrust into the film in the elevated position and automatically released in the lowered position of said carrier.

In testimony whereof, we set our hands, this 30th day of April 1917.

FRED A. GILDERSLEEVE.
WILLIAM L. TRICE.